E. O. COLLINS.
OPERATING TOOL FOR SPLIT TIRE RIMS.
APPLICATION FILED AUG. 11, 1915.
1,234,631.
Patented July 24, 1917.
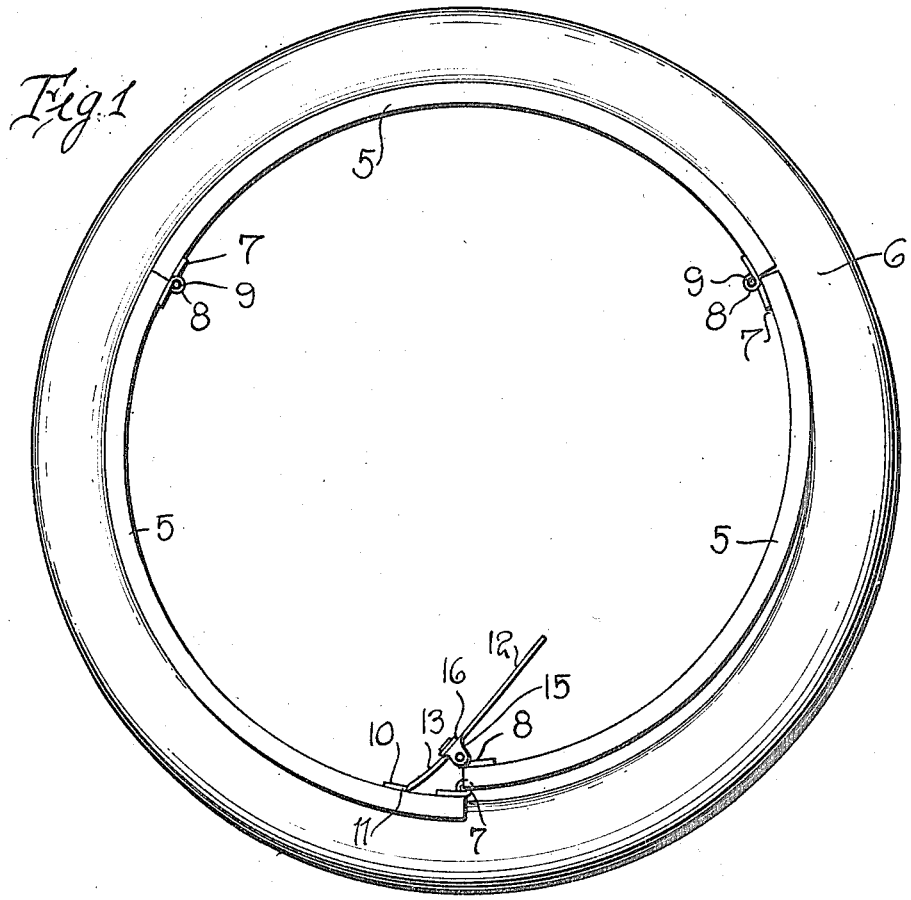
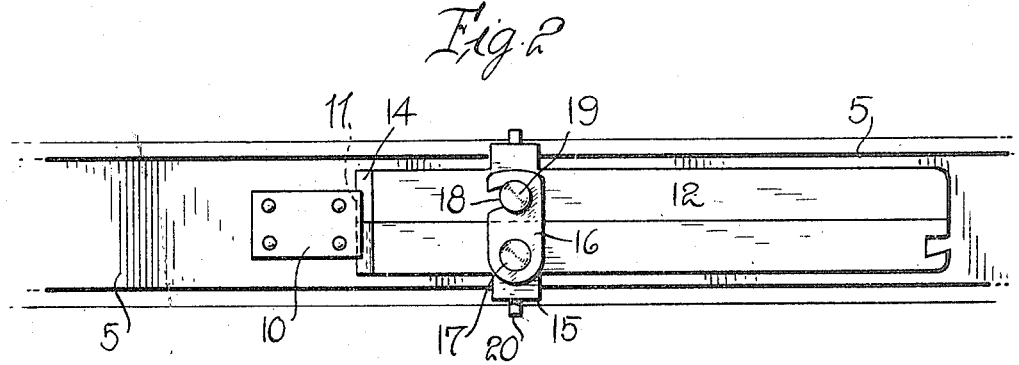
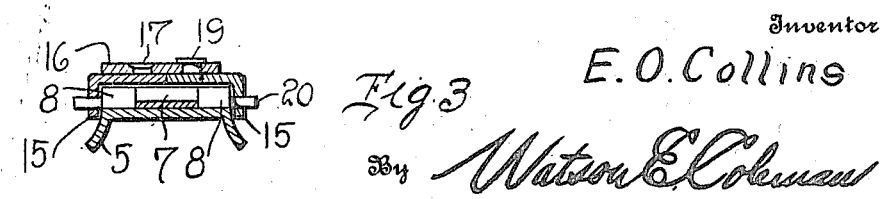
Inventor
E. O. Collins
By Watson E. Coleman
Attorney

UNITED STATES PATENT OFFICE.

ELBA O. COLLINS, OF CHILLICOTHE, OHIO.

OPERATING-TOOL FOR SPLIT TIRE-RIMS.

1,234,631.	Specification of Letters Patent.	Patented July 24, 1917.

Application filed August 11, 1915.	Serial No. 44,999.

*To all whom it may concern:*

Be it known that I, ELBA O. COLLINS, a citizen of the United States, residing at Chillicothe, in the county of Ross and State of Ohio, have invented certain new and useful Improvements in Operating-Tools for Split Tire-Rims, of which the following is a specification, reference being had to the accompanying drawings.

This invention relates to improved operating tools for split tire rims and has for its primary object to provide a tool of this character which may be easily and quickly applied to or detached from one end of the split rim to coöperate with the other end of the rim, whereby the rim ends may be forced into circumferential alinement and the rim expanded against the tire.

The invention has for a more particular object to provide a detachable operating tool for split tire rims of the character disclosed in Patent, No. 1,141,935, issued to me on June 8, 1915, wherein the rim consists of a plurality of sections having hinge knuckles at their extremities, the present invention providing means for readily applying the operating lever to the spaced hinge knuckles of one rim section, whereby the end of the lever may be engaged with the opposed rim sections and the knuckle of the latter section disposed in position between the spaced knuckles on the first rim section to receive a connecting pintle.

The invention has for a further general object to provide an operating tool for split tire rims, which is simple in its construction, highly serviceable and convenient in practical use, and capable of manufacture at relatively small cost.

With the above and other objects in view, my invention consists in the novel features of construction, combination and arrangement of parts to be hereinafter more fully described, claimed and illustrated in the accompanying drawing, in which, Figure 1 is a side elevation of a split tire rim, showing the improved operating lever applied to one of the rim sections and disposed in operative engagement with the adjacent rim sections for the purpose of forcing the sections into circumferential alinement against the inner face of a wheel tire;

Fig. 2 is an enlarged plan view of one of the rim sections with the lever applied thereto;

Fig. 3 is a transverse section with the hinge knuckles of the adjacent rim sections disposed in alinement to receive the connecting pintle.

Referring in detail to the drawing, 5 designates the sections of a split tire rim which may be of any desired cross-sectional form and upon which the tire, indicated at 6, is adapted to be mounted. In the illustrated embodiment of my invention, I have shown the rim made up of three sections, each of which is of curvilinear form so that when the several sections are in circumferential alinement with each other, they will define a continuous annular rim. Upon the inner face of each rim section, at one end thereof, a single hinge knuckle 7 is centrally secured, while the hinge plate on the opposite extremity of the rim section is formed with the spaced knuckles 8. The intermediate section of the rim is connected to the end sections thereof by pintles 9 extending through the coinciding hinge knuckles. Adjacent to the single knuckle 7 on one of the end sections of the rim, a plate 10 is secured, said plate having an undercut or beveled end edge 11 facing the extremity of the rim section.

My improved operating tool or lever embodies two similar sections 12 which correspond in length and width. Each of these lever sections has one of its ends longitudinally curved, as shown at 13, and the end edge thereof is beveled or inclined, as at 14. Upon one of the longitudinal edges of each lever member 12, a laterally offset angularly projecting ear 15 is formed. A locking plate 16 is pivoted at one of its ends, as at 17, upon one of the lever members. Adjacent to the opposite end of said plate, the same is formed with a curved slot 18 which opens upon one longitudinal edge of the plate. This slot is adapted to receive a heavy pin or stud 19 fixed to the other of the lever members 12.

When the two lever members 12 are assembled with their inner edges in abutting engagement and the locking plates 16 engaged upon the stud 19, whereby the lever members are held against relative movement, the ears 15 of said members are spaced sufficiently to receive between them the spaced hinge knuckles 8 on the extremity of one of the end sections of the rim. The ears 15 are perforated to coincide with the bores of the spaced hinge knuckles and through each of the knuckles and the ear on one of the lever members, a pin, shown at 20 in Fig. 3, is adapted to be inserted. It will, however, be understood that, if desired, inwardly projecting pins or studs may be integrally formed upon the ears 15 to be inserted into the bores of the respective hinge knuckles. When the connected lever members are mounted in this manner, a lever of considerable width is provided, which is fulcrumed upon the end of one of the rim sections. In applying the split rim to the tire, the sections of the rim which are in a collapsed condition, are arranged within the annular tire and then spread apart. The lever being mounted upon one section of the rim, as above explained, the beveled end edges 14 of the lever members are engaged under the beveled or undercut end of the plate 10 on the contiguous rim section. Pressure is then exerted upon the opposite ends of the lever members to force the same inwardly against the rim section upon which the lever is mounted. The two rim sections are thus moved in relatively opposite directions until the ends thereof are in abutting engagement and the rim sections are in circumferential alinement with each other. The single knuckle 7 on the rim section, with which the end of the lever is engaged, moves into position between the spaced knuckles 8 on the latter rim section. The lever sections are then removed from the knuckles 8, and a suitable pintle inserted through the coinciding knuckles. Thus, the several sections of the rim will be connected together and held in tight engagement against the inner face of the door.

From the above description, taken in connection with the accompanying drawing, it will be seen that I have devised a very serviceable rim operating tool or lever which may be easily and quickly applied to the rim or removed therefrom. Heretofore, it has been customary in this art, to provide the split rim with permanent means carried by the rim, whereby the rim may be expanded into annular form against the tire. Such tire rims are comparatively expensive to manufacture, and my invention eliminates this heavy cost of production and provides a tool which, in itself, can be produced at very small manufacturing cost and may be removably employed in connection with such split tire rims. It is apparent, of course, that my improved operating tool may be used in connection with wheel rims consisting of a single part instead of a number of hingedly connected sections, and the knuckles provided at the extremity of the single continuous rim for connecting the same together.

In the drawing, I have disclosed what I believe to be the present preferred embodiment of the invention; but it is to be understood that the several structural parts thereof may be greatly modified in form and proportion and I, therefore, reserve the privilege of adopting all such legitimate changes as may be fairly embodied within the spirit and scope of the invention as claimed.

Having thus fully described my invention, what I desire to claim and secure by Letters Patent is:—

A tool for applying to a tire a divided rim which has near one end laterally projecting pintles, which tool comprises a pair of levers each having a laterally projecting ear having a perforation to receive one of said pintles, and means for coupling the levers together when each of them has been so engaged to constitute a common lever engageable with the opposite end of the rim to bring the two ends of the rim into the desired relation.

In testimony whereof I hereunto affix my signature in the presence of two witnesses.

ELBA O. COLLINS.

Witnesses:
JOHN A. BOLAND,
RACHEL SEGEL.

Copies of this patent may be obtained for five cents each, by addressing the "Commissioner of Patents Washington, D. C."